(12) United States Patent
Graze, Jr. et al.

(10) Patent No.: US 7,281,440 B2
(45) Date of Patent: Oct. 16, 2007

(54) PARTICULATE SAMPLING SYSTEM HAVING FLOW CHECK DEVICE

(75) Inventors: Russell Robert Graze, Jr., Dunlap, IL (US); Jerry Kirk Randall, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 158 days.

(21) Appl. No.: 11/117,457

(22) Filed: Apr. 29, 2005

(65) Prior Publication Data

US 2006/0243026 A1    Nov. 2, 2006

(51) Int. Cl.
*G01N 1/20* (2006.01)
*G01M 15/00* (2006.01)

(52) U.S. Cl. ............... 73/863.02; 73/863.01; 73/863; 73/116

(58) Field of Classification Search ........... 73/866.4, 73/863, 863.01, 863.02, 863.03, 116, 117.3, 73/118.2
See application file for complete search history.

(56) References Cited

U.S. PATENT DOCUMENTS

| | | | | |
|---|---|---|---|---|
| 4,586,367 A | * | 5/1986 | Lewis | 73/23.33 |
| 4,633,706 A | * | 1/1987 | Ito et al. | 73/23.33 |
| 4,654,058 A | * | 3/1987 | Schober et al. | 96/407 |
| 4,727,746 A | * | 3/1988 | Mikasa et al. | 73/23.31 |
| 5,058,440 A | | 10/1991 | Graze, Jr. | |
| 5,129,257 A | * | 7/1992 | Carduner et al. | 73/116 |
| 5,243,847 A | | 9/1993 | Engeljehringer et al. | |
| 5,469,731 A | * | 11/1995 | Decker et al. | 73/23.31 |
| 5,546,788 A | | 8/1996 | Dickow | |
| 5,650,565 A | | 7/1997 | Nagy et al. | |
| 5,756,360 A | * | 5/1998 | Harvey et al. | 436/179 |
| 5,845,627 A | * | 12/1998 | Olin et al. | 123/676 |
| 6,200,819 B1 | * | 3/2001 | Harvey et al. | 436/179 |
| 6,370,936 B1 | | 4/2002 | Yamagishi et al. | |
| 6,553,818 B1 | | 4/2003 | Blumke et al. | |
| 6,615,677 B2 | * | 9/2003 | Dickson et al. | 73/863.01 |
| 6,694,728 B2 | | 2/2004 | Sekiya et al. | |
| 7,021,130 B2 | * | 4/2006 | Schmidt | 73/118.1 |
| 2003/0079555 A1 | | 5/2003 | Dickson et al. | |
| 2003/0082821 A1 | | 5/2003 | Lanier et al. | |
| 2003/0082822 A1 | | 5/2003 | Lanier et al. | |
| 2003/0167859 A1 | * | 9/2003 | Dickson et al. | 73/863.02 |
| 2004/0118223 A1 | * | 6/2004 | Dickson et al. | 73/863.23 |

FOREIGN PATENT DOCUMENTS

WO    WO 01/90741 A2    11/2001

* cited by examiner

*Primary Examiner*—Hezron Williams
*Assistant Examiner*—Rodney Frank
(74) *Attorney, Agent, or Firm*—Finnegan, Henderson, Farabow, Garrett, & Dunn

(57) ABSTRACT

A particulate sampling system is disclosed. The particulate sampling system may include an exhaust sampling unit and a dilution flow assembly to supply dilution air to the exhaust sampling unit. The particulate sampling system may also include a total flow assembly to receive dilution air and exhaust. The particulate sampling system may further include a flow regulation assembly configured to control flow rates in the dilution flow assembly and the total flow assembly. The particulate sampling system may also include a flow check assembly configured to measure the accuracy of the flow regulation assembly.

27 Claims, 2 Drawing Sheets

PARTICULATE SAMPLING SYSTEM HAVING FLOW CHECK DEVICE

TECHNICAL FIELD

The present disclosure relates to a particulate sampling system, and more particularly, to a particulate sampling system having a flow check assembly.

BACKGROUND

Engines, including diesel engines, gasoline engines, natural gas engines, and other engines known in the art, may exhaust a complex mixture of air pollutants. The air pollutants may be composed of gaseous and solid material, which may include particulate matter. Particulate matter may include unburned carbon particles, which are also called soot.

Due to increased attention on the environment, exhaust emission standards have become more stringent. The amount of particulates emitted from an engine may be regulated depending on the type of engine, size of engine, and/or class of engine. One method that has been implemented by engine manufacturers to ensure compliance with exhaust emission standards has been to periodically sample the emissions of engines within test cells.

One such method is described in U.S. Pat. No. 5,546,788 ("the '788 patent") issued to Dickow on Aug. 20, 1996. The '788 patent introduces a method and apparatus wherein a sample of engine exhaust gases is diluted and aspirated through a measuring device in which the quantity of solid particles (particulate matter) is measured. The actual quantity of the exhaust gases in the total quantity of aspirated gases flowing through the measuring device is determined, in a by-pass phase when the exhaust gases are cut-off, by measuring the amount of substitute outside air which replaces the exhaust gases flowing through the measuring device. The concentration of the particles in the exhaust gases is determined from the ratio of the measured quantity of solid particles and the mass flow of the air measured in the mass flow meter.

The method and apparatus of the '788 patent may not perform a self-check step to determine the accuracy of the apparatus. Because the accuracy of measuring devices may drift over time, the ability to perform a self-check to determine accuracy and/or calibrate the apparatus prior to actual testing may be important in obtaining accurate test results.

The particulate sampling system of the present disclosure is directed towards overcoming one or more of the problems set forth above.

SUMMARY OF THE INVENTION

In one aspect, the present disclosure may be directed to a particulate sampling system. The particulate sampling system may include an exhaust sampling unit configured to receive exhaust, a dilution flow assembly located upstream of the exhaust sampling unit and configured to supply dilution air to the exhaust sampling unit, and a total flow assembly located downstream of the exhaust sampling unit and configured to receive dilution air and exhaust. The particulate sampling system may also include a flow regulation assembly configured to control flow rates in the dilution flow assembly and the total flow assembly, and a flow check assembly configured to measure the accuracy of the flow regulation assembly.

In another aspect, the present disclosure may be directed to a method for determining the concentration of particles in an exhaust gas. The method may include passing exhaust to an exhaust sampling unit, and passing dilution air through a dilution flow assembly at a first predetermined flow rate using a flow regulation assembly. The method may also include passing diluted exhaust through a total flow assembly at a second predetermined flow rate using the flow regulation assembly, and comparing the first predetermined flow rate to the second predetermined flow rate to determine an exhaust flow rate. The method may further include selectively bypassing the dilution air around the exhaust sampling unit to the total flow assembly, and allowing air to flow to the total flow assembly while bypassing. The method may also include measuring an air flow rate, and comparing the determined exhaust flow rate and the measured air flow rate to check the accuracy of the determined exhaust flow rate.

In yet another aspect, the present disclosure may be directed to a an engine test cell. The engine test cell may include an internal combustion engine and an air supply unit configured to provide air to the internal combustion engine during testing of the internal combustion engine in the engine test cell. The engine test cell may also include an engine air intake operatively connected to the internal combustion engine and at least one conduit to channel air from the air supply unit to the engine air intake. The engine test cell may further include an engine stack to channel exhaust away from the internal combustion engine and a particulate sampling system operatively connected to the engine stack. The particulate sampling system may include an exhaust sampling unit configured to receive exhaust and a dilution flow assembly located upstream of the exhaust sampling unit and configured to supply dilution air to the exhaust sampling unit. The particulate sampling system may also include a total flow assembly located downstream of the exhaust sampling unit and configured to receive dilution air and exhaust. The particulate sampling system may further include a flow regulation assembly configured to control flow rates in the dilution flow assembly and the total flow assembly, and a flow check assembly configured to measure the accuracy of the flow regulation assembly.

DETAILED DESCRIPTION

Figure 1:
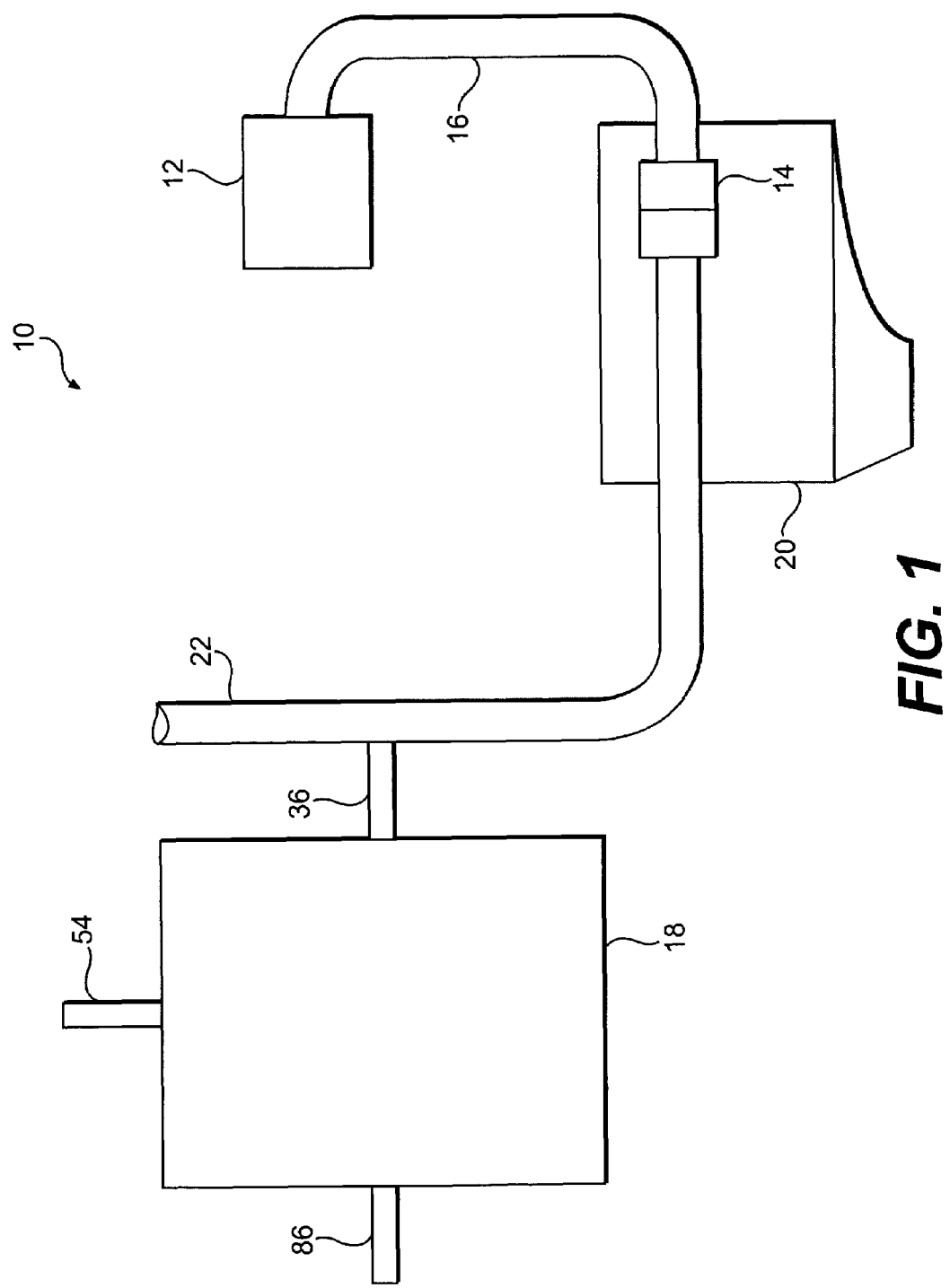
FIG. 1 provides a diagrammatic illustration of an engine test cell, according to an exemplary disclosed embodiment.

FIG. 1 illustrates an engine test cell 10 according to an exemplary disclosed embodiment. This engine test cell 10 may be used to test emissions of, for example, diesel engines, gasoline engines, and gaseous fuel-powered engines. Engine test cell 10 may include an air supply unit 12, an engine air intake 14, one or more conduits 16 between the air supply unit 12 and engine air intake 14, an engine 20, and a particulate sampling system 18. Engine 20 may expel exhaust through an engine stack 22.

Figure 2:
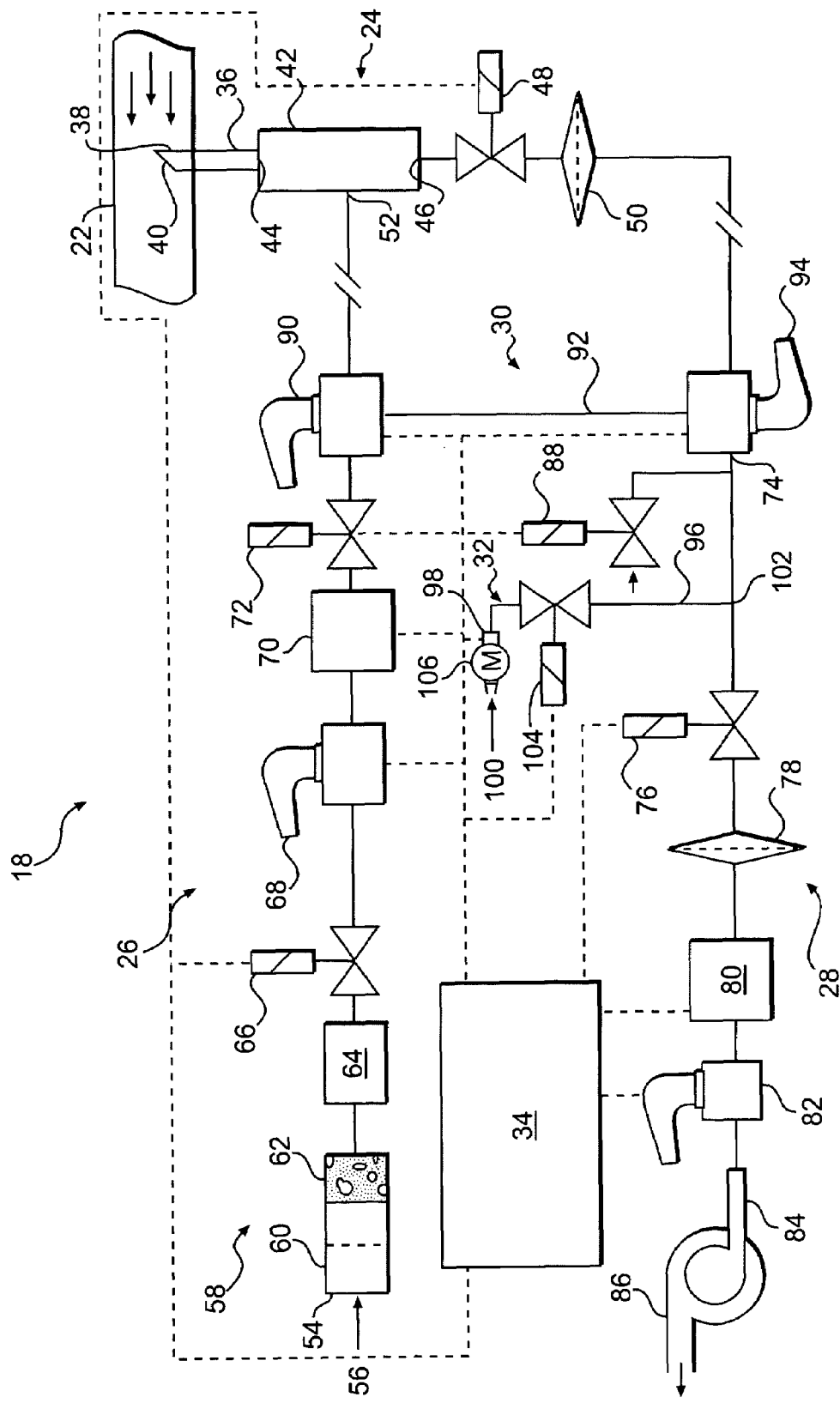
FIG. 2 provides a diagrammatic illustration of an exemplary disclosed particulate sampling system for the engine test cell of FIG. 1.

As illustrated in FIG. 1, engine test cell 10 may include particulate sampling system 18 to assist in quantifying one or more parameters of engine exhaust. For example, in response to receiving exhaust, particulate sampling system 18 may determine flow rate, concentration of particulate matter, and other values of the exhaust which may be recorded and used for emissions testing. Particulate sampling system 18 and its components are illustrated in FIG. 2. In one embodiment, particulate sampling system 18 may include an exhaust sampling unit 24, a dilution flow assembly 26, a total flow assembly 28, a bypass 30, a flow check assembly 32, and a controller 34. Each of the sub-components may have a variety of configurations to suit a particular application. Exemplary sub-components of particulate sampling system 18 will be discussed, but the claimed invention is not limited to these specific configurations.

Exhaust sampling unit 24 may be operatively connected to engine stack 22. Exhaust sampling unit 24 may be configured to receive exhaust from engine 20 for testing. Exhaust sampling unit 24 may include a dilution tunnel 42, a sample probe 36, a sample valve 48, and a filter 50.

Dilution tunnel 42 may be of the mixing box type or may include a porous center tube having a plurality of micron-sized holes located in an air distribution tube positioned within an air supply chamber. Dilution tunnel 42 may be connected to engine stack 22 of engine 20 in a low pressure section of engine stack 22 where excursions are minimized. Exhaust may enter dilution tunnel 42 through a first dilution tunnel inlet 44, mix with other gas flows within dilution tunnel 42, and then exit through dilution tunnel outlet 46. The sample valve 48 may be operatively connected to dilution tunnel 44, and may be capable of selectively blocking outlet 46.

The sample probe 36 may extend into engine stack 22 and may be operatively connected to first dilution tunnel inlet 44. It is contemplated that sample probe 36 may be a square-root extractor and may include a nose portion 38 defining an inlet passage 40 projecting into engine stack 22. Exhaust traveling through engine stack 22 may enter sample probe 36 through inlet passage 40.

Filter 50 may be connected in series to sample valve 48. Filter 50 may be configured to capture particulate matter in exhaust leaving dilution tunnel 42. Filter 50 may include a removable filter element which may be weighed to determine a mass value for particulate matter captured in filter 50. It is contemplated that filter 50 may be made of ceramic, fibers, fabric mesh, or any other suitable material.

Dilution tunnel 42 may also include a second inlet 52 configured to receive dilution air from dilution flow assembly 26. Dilution flow assembly 26 may regulate the flow of dilution air entering dilution tunnel 42. Dilution flow assembly 26 may include a dilution air inlet 54, a supply of dilution air 56, an air scrubber 58, an air chiller 64, a dilution air pressure control valve 66, a system on/off valve 68, and a dilution flow meter 70.

Dilution air may enter dilution flow assembly 26 through the air scrubber 58. Air scrubber 58 may improve the cleanliness of dilution air and may include a desiccant filter 60 and a charcoal scrubber 62. Desiccant filter 60 may be configured to remove excess moisture from dilution air. Charcoal scrubber 62 may be configured for removing oil and/or hydrocarbons from dilution air. Upon exiting air scrubber 58, dilution air may then pass through air chiller 64. Air chiller 64 may be configured to remove heat from dilution air to cool it to a desired temperature. Dilution air pressure control valve 66 may be operatively connected to air chiller 64 to selectively block dilution air from passing entirely through dilution flow assembly 26. Another valve, system on/off valve 68, may also be configured to selectively perform a similar function.

Dilution flow meter 70 may operate in conjunction with a dilution air control valve 72 to set a first predetermined flow rate through dilution flow assembly 26. In one embodiment, dilution flow meter 70 may include a laminar flow element configured to receive dilution air and separate it into thin channels to determine the rate of flow. Additionally, it is contemplated that dilution flow meter 70 may also include a thermal mass flow meter, mass compensated positive displacement roots meter, or any other suitable flow measurement device.

Total flow assembly 28 may be operatively connected to dilution tunnel 42. A total flow inlet 74 may selectively fluidly communicate with dilution tunnel 42. Total flow inlet 74 may be configured to receive mixed dilution air and exhaust from dilution flow assembly 26 and exhaust sampling unit 24. Total flow assembly 28 may include a total flow control valve 76, a system filter 78, a total flow meter 80, a leak check valve 82, a total flow outlet 84, a vacuum pump 86, and a sample bypass on/off valve 88.

Total flow control valve 76 may be configured to adjust the rate of the combined flow of dilution air and exhaust through total flow assembly 28. System filter 78 may be located downstream of total flow control valve 76. System filter 78 may be configured to capture any residual particulate matter before it may enter a total flow meter 80. Total flow meter 80 may include a mass compensated roots meter, laminar flow element, thermal mass flow meter, or any other suitable flow measurement device, and may operate in conjunction with total flow control valve 76 to set a predetermined flow rate through total flow assembly 28.

Total flow outlet 84 may be located on an end opposite total flow inlet 74. Vacuum pump 86 may be associated with total flow outlet 84. Vacuum pump 86 may be configured to draw the various flows through particulate sampling system 18, and to expel the various flows from particulate sampling system 18. Sample bypass on/off valve 88 may be configured to allow vacuum pump 86 to draw in air when total flow assembly 28 becomes isolated from the rest of particulate sampling system 18.

Vacuum pump 86, dilution air control valve 72, total flow control valve 76, dilution flow meter 70, and total flow meter 80 may be components of a flow regulation assembly. The flow regulation assembly may be used to set the flow rates of gas passing through dilution flow assembly 26 and total flow assembly 28 to predetermined values. For example, dilution air control valve 72 and dilution flow meter 70 may act as a first flow regulator by adjusting dilution air control valve 72 to a position corresponding to a desired flow rate value as measured by dilution flow meter 70. A similar relationship may exist between total flow control valve 76 and total flow meter 80. It is also contemplated that vacuum pump 86 may be selectively set at different levels to draw in gases at desired flow rates.

Bypass 30 may be operatively connected to dilution flow assembly 26 and total flow assembly 28. Bypass 30 may have at least two modes of operation: a sample mode, wherein dilution air may travel from dilution flow assembly 26 into dilution tunnel 42; and a flow check/calibration mode, wherein dilution air does not enter dilution tunnel 42, but may be diverted into bypass 30. Bypass 30 may include a first valve device 90, a bypass line 92, and a second valve device 94.

First valve device 90 may be operatively connected to dilution flow assembly 26. First valve device 90 may be configured to direct dilution air from dilution flow assembly 26 into dilution tunnel 42 during sample mode, and to direct dilution air into bypass 30 during flow check/calibration mode. Bypass line 92 may be in fluid communication with first valve device 90, and may receive dilution air while particulate sampling system 18 is in flow check/calibration mode. Bypass line 92 may also be in fluid communication with a second valve device 94 to pass dilution air into second valve device 94 during flow check/calibration mode. Second valve device 94 may be configured to direct diluted exhaust gas from dilution tunnel 42 into total flow assembly 28 during sample mode, and to direct dilution air from bypass line 92 into total flow assembly 28 during flow check/calibration mode.

Flow check assembly 32 may be operatively connected to total flow assembly 28, and may be configured to selectively fluidly communicate with total flow assembly 28. Flow check assembly 32 may include an air line 96, an on/off valve 104, and a flow check meter 106.

Air line 96 may have an inlet 98 in fluid communication with an air supply 100 and an outlet 102 fluidly communicating with total flow assembly 28. Air line 96 may provide a channel for air flow between inlet 98 and outlet 102. Air line 96 may be a pipe, conduit, or any other suitable means for directing gaseous flows. On/off valve 104 may be operatively connected to air line 96. On/off valve 104 may be configured to selectively allow air to travel from air supply 100 into total flow assembly 28 during flow check/calibration mode.

Flow check meter 106 may be configured to measure air flow passing through air line 96. Flow check meter 106 may include a thermal mass flow meter, laminar flow element, mass compensated positive displacement roots meter, or any other suitable flow measurement device.

Leak check valve 82 may assist in performing a leak check function on dilution flow assembly 26 and total flow assembly 28. Leak check may be performed by first closing sample bypass on/off valve 88, on/off valve 104, and leak check valve 82. Additionally, first valve device 90 and second valve device 94 may be adjusted to bypass dilution tunnel 42 while placing dilution flow assembly 26 and total flow assembly 28 in series. Then compressed air may be supplied to inlet 54 to pressurize particulate sampling system 18 between inlet 54 and leak check valve 82. At this point, dilution air pressure control valve 66 may be adjusted to closed position, thus isolating and pressurizing particulate sampling system 18 between dilution air pressure control valve 66 and leak check ball valve 82. Additionally, in the alternative, first valve device 90 may be adjusted to closed position such that compressed air supplied to inlet 54 may pressurize only dilution flow assembly 26 between inlet 54 and first valve device 90. Either way, the pressurized portion of particulate sampling system 18 may be monitored to determine flow loss and pressure loss over time.

The leak check function may also be carried out by vacuum rather than pressurization. For example, the leak check function may begin by first closing sample bypass on/off valve 88, on/off valve 104, and sample valve 48. Then, vacuum pump 86 may be activated to draw air out of particulate sampling system 18, thus creating a vacuum between pump 86 and sample valve 48. At this point, leak check valve 82 may be adjusted to closed position, thus isolating total flow assembly 28. The isolated portion of particulate sampling system 18 may be monitored to determine any change in vacuum pressure over time. Performing the leak check function in this manner may be advantageous because any leakage in and around filter 50 may be detected. It is further contemplated that the leak check function may also be performed by a combination of the two methods described above.

Each of the above described valves and valve devices may be a mechanical device by which the flow of liquid, gas, or loose material in bulk may be started, stopped, or regulated by a movable part that opens, shuts, or partially obstructs one or more ports or passageways. It is contemplated that the valves and valve devices may be adjusted by manual or electronic control. For example, the valves may be controlled by controller 34 as shown in FIG. 2.

Controller 34 may communicate with dilution flow assembly 26, exhaust sampling unit 24, bypass 30, total flow assembly 28, and flow check assembly 32. Controller 34 may be configured to allow users to set flow rates, record measurements from measuring devices, and perform calculations. Furthermore, controller 34 may determine error and accuracy values for particulate sampling system 18, and may enter an automatic fault condition when those values fall outside of a predetermined range. In addition, controller 34 may automatically update particulate sampling system 18 to compensate for error, improve accuracy, and enhance the quality of test results.

Controller 34 may embody a single microprocessor or multiple microprocessors that include a means for controlling an operation of particulate sampling system 18. Numerous commercially available microprocessors can be configured to perform the functions of controller 34. Various other known circuits may be associated with controller 34, including power supply circuitry, signal-conditioning circuitry, solenoid driver circuitry, communication circuitry, and other appropriate circuitry.

INDUSTRIAL APPLICABILITY

The disclosed particulate sampling system may be used for quantification of gravimetric particulate matter concentration or to act as a diluter for a particulate sizing device. In one exemplary disclosed embodiment, the particulate sampling system may be used to determine the amount of gravimetric particulate matter in the exhaust gas from an engine, and to self check for accuracy. The operation of the particulate sampling system will now be explained.

Particulate sampling system 18 may have at least two modes of operation: a sample mode, and a flow check mode. For example, particulate sampling system 18 may have a sample mode for measuring particulate matter in exhaust. In sample mode, first valve device 90 may be adjusted to direct dilution air from dilution flow assembly 26 to exhaust sampling unit 24. Second valve device 94 may be adjusted to direct dilution air and exhaust from exhaust sampling unit 24 to total flow assembly 28. Dilution air control valve 72 may be adjusted to allow a first predetermined flow rate to pass through dilution flow assembly 26. Similarly, total flow control valve 76 may be adjusted to allow a second predetermined flow rate, greater than or equal to the first predetermined flow rate, to pass through total flow assembly 28. Furthermore, on/off valve 104 may be adjusted to a closed position to block air flow from air supply 100 from entering total flow assembly 28.

By adjusting particulate sampling system 18 as described above, dilution flow assembly 26, exhaust sampling unit 24, and total flow assembly 28 may be fluidly connected in series. When vacuum pump 86 activates, dilution air may be drawn into and passed through dilution flow assembly 26 and total flow assembly 28. As a result, a sample of exhaust from engine stack 22 may be drawn into exhaust sampling unit 24 at a rate substantially equivalent to the difference between the first and second predetermined flow rates. Within exhaust sampling unit 24, the exhaust sample may be mixed with dilution air from dilution flow assembly 26 before passing through filter 50. Captured particulate matter in filter 50 may be weighed to determine the mass of particulate matter in the exhaust sample. An exhaust sample flow rate may be calculated by determining the difference between the first and second predetermined flow rates. The total volume of the exhaust sample producing the particulate matter may then be calculated by multiplying the exhaust flow rate value by a value equivalent to the length of time that the diluted exhaust sample was passed through filter 50. The concentration of particulate matter in the exhaust sample may be determined by comparing the mass of captured particulate matter in filter 50 to the total volume of the exhaust sample.

Flow check mode may be used before and/or after sampling to more precisely determine the concentration of particulate matter in the exhaust sample. In flow check mode, first valve device 90 may be adjusted to direct dilution air into bypass line 92 and block dilution air from entering exhaust sampling unit 24. Second valve device 94 may be adjusted to receive dilution air from bypass line 92 and direct it into total flow assembly 28. In doing so, second valve device 94 may block gases in exhaust sampling unit 24 from entering total flow assembly 28. Dilution air control valve 72 may be adjusted to allow a first predetermined flow rate to pass through dilution flow assembly 26. Similarly, total flow control valve 76 may be adjusted to allow a second predetermined flow rate, greater than or equal to the first predetermined flow rate, to pass through total flow assembly 28. Furthermore, on/off valve 104 may be adjusted to an opened position to allow air to flow from air supply 100 into total flow assembly 26.

By adjusting particulate sampling system 18 in the manner described above, dilution flow assembly 26 and total flow assembly 28 may be fluidly connected in series. When vacuum pump 86 activates, dilution air may be drawn into total flow assembly 28. As a result, air from air supply 100 may be drawn into total flow assembly 28 through air line 96 at a rate substantially equal to the difference between the first and second predetermined flow rates. Any air flow through air line 96 may be measured using flow check meter 106 to obtain an air flow rate. The air flow rate may represent the amount of exhaust being drawn into exhaust sampling unit 24 during sample mode. This value may be used to determine the concentration of particulate matter in exhaust by comparing the mass of captured particulate matter in filter 50 (during sample mode) to the measured air flow rate.

An error value for particulate sampling system 18 may be calculated by determining the difference between the determined exhaust flow rate via dilution flow meter 70 and total flow meter 80, and the measured air flow rate via flow check meter 106. The error value may be useful in a variety of ways. For example, the determined exhaust flow rate may be offset by an amount substantially equivalent to the error value to achieve a more accurate measure of the concentration of particulate matter in exhaust. Also, if the error value exceeds a specified range, a response may be elicited from controller 34. Controller 34 may recalibrate particulate sampling system components in order to reduce the error value so test results are more accurate. For example, controller 34 may zero dilution flow meter 70, total flow meter 80, dilution air control valve 72, total flow control valve 76, and/or vacuum pump 86, so the first and second predetermined flow rates agree with actual flow rates passing through particulate sampling system 18. Controller 34 may also enter a fault condition so that subsequent test results will not be taken until particulate sampling system 18 is recalibrated. Additionally, controller 34 may signal to a user that particulate sampling system 18 may need service before testing can continue.

Particulate sampling system 18 may have several advantages over the prior art. For example, in addition to determining the concentration of particulate matter in engine exhaust, particulate sampling system 18 may also be configured to perform self checking to determine its own accuracy. This self-check function may be readily performed anytime before and/or after exhaust testing. For example, in an EPA transient test, an engine may run for twenty minutes, followed by an equivalent period of time where the engine may be shut off. The self-checking function may be conducted during that period of time where the engine is shut off and sampling is not taking place. Self checking may allow calibration to be performed to standardize particulate sampling system 18 by determining the deviation from a standard so as to ascertain the proper correction factors and achieve improved results. Also, the self-check function may determine the quality of determined flow for a flow regulation assembly.

Advantages may be derived from physically incorporating flow check assembly 32 in particulate sampling system 18. For example, operatively connecting flow check assembly 32 to total flow assembly 28 may avoid the need for placing a physically invasive flow measurement device between engine stack 22 and dilution tunnel 42, which may cause significant measurement error by preventing particulate matter from entering sample probe 36. Also, by operatively connecting flow check assembly 32 to total flow assembly 28, the difficult task of physically disconnecting dilution tunnel 42 from engine stack 22 to install a flow measurement device may be avoided.

Particulate sampling system 18 may also improve the efficiency of the engine testing process. For example, particulate sampling system 18 may be automatically controlled by controller 34. Controller 34 may accept user inputs, set flow rates, record measurements, and perform calculations to determine error. In response to error, controller 34 may recalibrate and adjust components, such as flow measurement devices and flow regulators, to produce consistent, accurate, and repeatable test results. Furthermore, by monitoring the accuracy of particulate sampling system 18, the probability of producing poor test results may be decreased.

It will be apparent to those skilled in the art that various modifications and variations can be made in the disclosed particulate sampling system without departing from the scope of the disclosure. Additionally, other embodiments of the disclosed particulate sampling system will be apparent to those skilled in the art from consideration of the specification. It is intended that the specification and examples be considered as exemplary only, with a true scope of the disclosure being indicated by the following claims and their equivalents.

What is claimed is:

1. A particulate sampling system comprising:
   an exhaust sampling unit configured to receive exhaust;
   a dilution flow assembly located upstream of the exhaust sampling unit and configured to supply dilution air to the exhaust sampling unit;
   a total flow assembly located downstream of the exhaust sampling unit and configured to receive dilution air and exhaust;
   a flow regulation assembly configured to control flow rates in the dilution flow assembly and the total flow assembly; and a flow check assembly configured to measure the accuracy of the flow regulation assembly.

2. The system of claim 1, including a bypass disposed between the dilution flow assembly and the total flow assembly, the bypass configured to selectively bypass dilution air around the exhaust sampling unit to the total flow assembly.

3. The system of claim 2, wherein the flow check assembly includes an air line configured to supply air to the total flow assembly when bypassing.

4. The system of claim 3, wherein the flow check assembly includes a flow check valve configured to selectively block the air.

5. The system of claim 3, wherein the flow check assembly includes a flow meter configured to measure an air flow rate.

6. The system of claim 1, wherein the flow regulation assembly is configured to selectively pass a first predetermined flow rate of dilution air through the dilution flow assembly and a second predetermined flow rate of diluted exhaust through the total flow assembly, the difference between the first predetermined flow rate and the second predetermined flow rate used to determine an exhaust flow rate.

7. The system of claim 6, including:
a controller in communication with the flow regulation assembly and the flow check assembly, the controller configured to calculate the difference between the determined exhaust flow rate and the measured air flow rate to obtain an error value.

8. The system of claim 7, wherein the controller automatically adjusts the flow regulation assembly in response to the error value exceeding a predetermined value.

9. The system of claim 7, wherein the controller enters an automatic fault condition in response to the error value exceeding a predetermined value.

10. The system of claim 1, wherein the flow regulation assembly includes:
a first flow regulator operatively connected to the dilution flow assembly;
a second flow regulator operatively connected to the total flow assembly; and
a vacuum pump operatively connected to the total flow assembly.

11. The system of claim 10, wherein the first flow regulator includes:
a dilution flow meter; and
a dilution air control valve.

12. The system of claim 10, wherein the second flow regulator includes:
a total flow control valve; and
a total flow meter.

13. The system of claim 1, including a leak check mechanism configured to separately isolate and pressurize the dilution flow assembly and the total flow assembly.

14. The system of claim 13, wherein the leak check mechanism includes:
a pressure control valve operatively connected to the dilution flow assembly; and
a leak check valve operatively connected to the total flow assembly.

15. A method for determining the concentration of particles in an exhaust gas, comprising:
passing exhaust to an exhaust sampling unit;
passing dilution air through a dilution flow assembly at a first predetermined flow rate using a flow regulation assembly;
passing diluted exhaust through a total flow assembly at a second predetermined flow rate using the flow regulation assembly;
comparing the first predetermined flow rate to the second predetermined flow rate to determine an exhaust flow rate;
selectively bypassing the dilution air around the exhaust sampling unit to the total flow assembly;
allowing air to flow into the total flow assembly while bypassing;
measuring an air flow rate; and
comparing the determined exhaust flow rate and the measured air flow rate to check the accuracy of the determined exhaust flow rate.

16. The method of claim 15, including:
passing the diluted exhaust gas through a filter to remove particulate matter;
measuring the amount of particulate matter captured in the filter; and
determining the concentration of particulate matter in the exhaust by relating the amount of particulate matter captured in the filter to the determined exhaust flow rate.

17. The method of claim 15, including:
calculating the difference between the determined exhaust flow rate and the measured air flow rate to obtain an error value.

18. The method of claim 17, including:
offsetting the determined exhaust flow rate by the error value.

19. The method of claim 17, including:
automatically adjusting the flow regulation assembly in response to the error value.

20. The method of claim 19, including adjusting at least one flow measurement device.

21. The method of claim 19, including adjusting at least one of a control valve and a vacuum pump.

22. The method of claim 17, including:
automatically generating a fault condition if the error value exceeds a predetermined value.

23. An engine test cell comprising:
an internal combustion engine;
an air supply unit configured to provide air to the internal combustion engine during testing of the internal combustion engine in the engine test cell;
an engine air intake operatively connected to the internal combustion engine;
at least one conduit to channel air from the air supply unit to the engine air intake;
an engine stack to channel exhaust away from the internal combustion engine; and
a particulate sampling system operatively connected to the engine stack, comprising:
an exhaust sampling unit configured to receive exhaust;
a dilution flow assembly located upstream of the exhaust sampling unit and configured to supply dilution air to the exhaust sampling unit;
a total flow assembly located downstream of the exhaust sampling unit and configured to receive dilution air and exhaust;
a flow regulation assembly configured to control flow rates in the dilution flow assembly and the total flow assembly; and
a flow check assembly configured to measure the accuracy of the flow regulation assembly.

24. The engine test cell of claim 23, wherein the particulate sampling system includes:

a bypass disposed between the dilution flow assembly and the total flow assembly, the bypass configured to selectively bypass dilution air around the exhaust sampling unit to the total flow assembly.

25. The system of claim 24, wherein the flow check assembly includes:
an air line configured to supply air to the total flow assembly when bypassing;
a flow check valve configured to selectively block the air; and
a flow meter configured to measure an air flow rate.

26. The system of claim 1, wherein the exhaust sampling unit is configured to receive exhaust from an engine assembly external to the particulate sampling system.

27. The method of claim 15, where passing exhaust to an exhaust sampling unit includes passing exhaust from an engine assembly to the exhaust sampling unit located externally of the engine assembly.

* * * * *